United States Patent
Horovitz et al.

(10) Patent No.: US 7,899,206 B2
(45) Date of Patent: Mar. 1, 2011

(54) DEVICE, SYSTEM AND METHOD FOR DETERMINING COMPLIANCE WITH A POSITIONING INSTRUCTION BY A FIGURE IN AN IMAGE

(75) Inventors: Rinat Horovitz, Haifa (IL); Ronen Horovitz, Haifa (IL)

(73) Assignee: Eyecue Vision Technologies Ltd., Yokneam (IL)

( * ) Notice: Subject to any disclaimer, the term of this patent is extended or adjusted under 35 U.S.C. 154(b) by 141 days.

(21) Appl. No.: 12/406,586

(22) Filed: Mar. 18, 2009

(65) Prior Publication Data

US 2009/0180669 A1 Jul. 16, 2009

Related U.S. Application Data

(63) Continuation of application No. 11/389,310, filed on Mar. 27, 2006, now Pat. No. 7,515,734.

(51) Int. Cl.
G06K 9/00 (2006.01)
(52) U.S. Cl. ..................................... 382/100; 382/286
(58) Field of Classification Search ............... 382/100, 382/103, 132, 151, 153, 286, 291
See application file for complete search history.

(56) References Cited

U.S. PATENT DOCUMENTS

| | | | |
|---|---|---|---|
| 4,846,693 A | 7/1989 | Baer | 434/308 |
| 5,540,589 A | 7/1996 | Waters | 434/156 |
| 6,301,370 B1 | 10/2001 | Steffens et al. | 382/103 |
| 6,677,969 B1 | 1/2004 | Hongo | 345/863 |
| 6,879,953 B1 | 4/2005 | Oishi et al. | 704/231 |
| 6,904,263 B2 | 6/2005 | Grudnitski et al. | 434/308 |
| 6,925,122 B2 | 8/2005 | Gorodnichy | 375/240.16 |
| 2003/0133602 A1 | 7/2003 | Bani-Hashemi | 382/131 |
| 2005/0265583 A1 | 12/2005 | Covell et al. | 382/103 |
| 2006/0008136 A1 | 1/2006 | LeRoux | 382/153 |

OTHER PUBLICATIONS

Virtual Pat: A Virtual Personal Aerobics Trainer—pp. 1-6, James W. Davis & Aaron F. Bobick. MIT Media Lab, 20 Ames Street, Cambridge, MA 02139, 1998.
International Search Report of Application No. PCT/IL07/00373 mailed on Jul. 11, 2008.
International Report on Patentability for Application No. PCT/IL07/00373 mailed on Mar. 19, 2009.

*Primary Examiner* — Andrew W Johns
(74) *Attorney, Agent, or Firm* — Pearl Cohen Zedek Latzer LLP (57) ABSTRACT

A device, system and method for calculating location coordinates for a figure in an image that is illuminated by visible light, comparing such location coordinates to location coordinates of a figure, and evaluating compliance by such figure to an instruction to assume a defined position.

11 Claims, 4 Drawing Sheets

DEVICE, SYSTEM AND METHOD FOR DETERMINING COMPLIANCE WITH A POSITIONING INSTRUCTION BY A FIGURE IN AN IMAGE

CROSS REFERENCE TO RELATED APPLICATION

This application is a continuation of U.S. patent application Ser. No. 11/389,310 filed on Mar. 27, 2006, now U.S. Pat. No. 7,515,734, entitled "DEVICE, SYSTEM AND METHOD FOR DETERMINING COMPLIANCE WITH A POSITIONING INSTRUCTION BY A FIGURE IN AN IMAGE" which is incorporated in its entirety herein by reference.

FIELD OF THE INVENTION

The present invention generally relates to image processing, and particularly to evaluating a change in a position of a figure in an image.

BACKGROUND OF THE INVENTION

Various activities require that a user or subject assume a first position, and then in response to an instruction, assume a second position. For example, security confirmation procedures may require a user to first face a camera, and then look away from a camera. Sports, exercise programs, training courses or physical therapy regimens may require a user or subject to assume one or more positions in the course of a session, and to then change such positions in response to for example one or more instructions. Currently, a trained observer instructs a user or subject to change a position, and then evaluates or corrects the subject's compliance with the instruction by observing the changed position.

SUMMARY OF THE INVENTION

Embodiments of the invention include a system having an imaging device to capture an image of a figure using visible light, a processor and an output device, where the imaging device is to capture an image of a figure in a position and the processor is to determine compliance with an instruction to change the position of the figure. In some embodiments, the output device is to issue an indication of compliance with the instruction. In some embodiments, the output device is to issue an instruction to change a position of the figure to another position, and the processor is to determine compliance with such instruction. In some embodiments, the processor is to assess a non-compliance with the instruction, and the output device is to issue a suggestion to correct the non-compliance. In some embodiments, the processor is to identify a color of an object in the image. In some embodiments, the processor is to differentiate the figure in the image from background image data. In some embodiments, the processor is to calculate a coordinate of a skeleton of the figure. In some embodiments, the processor is to calculate an intersection of a head-torso axis and a shoulder axis of the figure. In some embodiments, the processor is to calculate a convex deficiency of a skeleton of the figure. In some embodiments, the processor is to calculate an openness of the convex deficiency. In some embodiments, the processor is to calculate a distance and position of a center of mass of a convex deficiency from a center of mass of a skeleton of the figure. In some embodiments, the processor is to identify a shape of an object in the image. In some embodiments, the processor is to cluster a color in the image. In some embodiments, the imaging device is to capture another image of the figure; and the processor is to calculate a distance and position of a center of mass of a convex deficiency from a center of mass of a skeleton of the figure in the image, and is to calculate a distance and position of a center of mass of a convex deficiency from a center of mass of a skeleton of the figure in the another image, and is to compare the distance and position of the figure in the image to the distance and position of the figure in the another image.

In some embodiments the invention comprises a device having a memory, a processor, an output device and an imager, where an image is captured using visible light and where the processor calculates two or more first location coordinates of a figure in an image; the output device issues a signal to alter a position of the figure, and the processor compares the two or more first location coordinates stored in the memory to two or more second location coordinates, and the output device issues a signal of a result of the comparison. In some embodiments, the two or more of the first location coordinates correspond to two or more mass center points of convex deficiencies of a skeleton of the figure. In some embodiments, the processor is to calculate two or more of clusters of colors in the image, and the processor it to compare the two or more clusters to color cluster information stored in the memory.

Some embodiments include a method of calculating a position coordinate of a figure in a first image that is captured using visible light, comparing the position coordinate of the figure in the first image to a position coordinate of the figure in a second image, and evaluating compliance by the figure in the second image with an instruction to assume a defined position. Some embodiments include calculating a distance and position of a mass center of a convex hull deficiency in the second image from a mass center of the figure in the second image. Some embodiments include clustering color pixels in the first image, and comparing clustered color pixels in the first image to color clusters in the second image.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features or processes may be omitted or simplified in order not to obscure embodiments of the invention described herein.

Unless specifically stated otherwise, as apparent from the following discussions, it is appreciated that throughout the specification, discussions utilizing terms such as "selecting," "processing," "computing," "calculating," "determining," "designating," "allocating" or the like, refer to the actions and/or processes of a computer, computer processor or computing system, or similar electronic computing device, that manipulate and/or transform data such as for example image data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, imager, output device or other apparatus. Embodiments of the invention described herein are not described with reference to any particular programming language, machine code, etc. It will be appreciated that a variety of programming languages, systems, protocols or hardware configurations may be used to implement the teachings of the embodiments of the invention as described herein.

Figure 1:
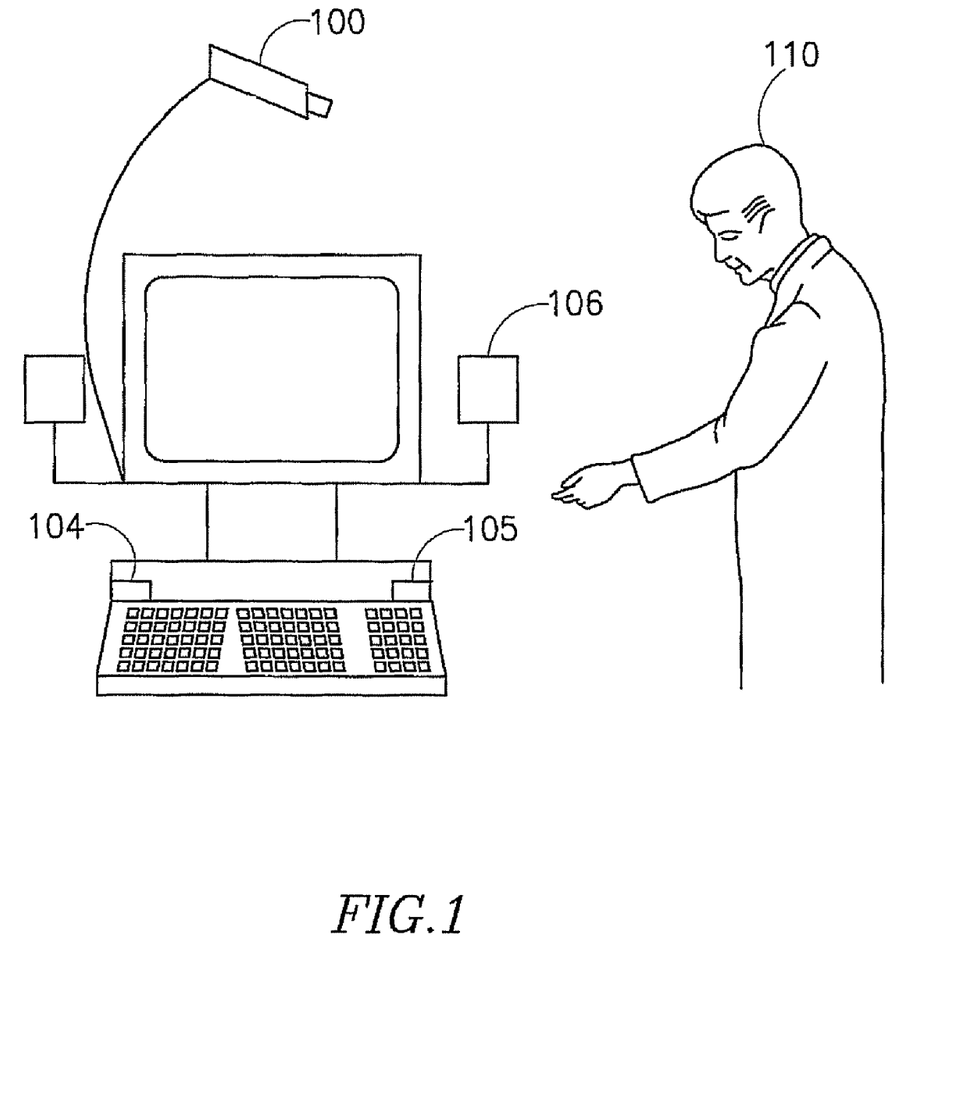
FIG. 1 is a conceptual illustration of components of a system, in accordance with a preferred embodiment of the present invention.

Reference is made to FIG. 1, a conceptual illustration of components of a system, in accordance with an embodiment of the invention. In some embodiments, components of a system that may be used in implementing an embodiment of the invention may include for example an imaging device 100 such as for example a camera, such as for example a digital camera, a color digital imager or another suitable digital imaging device 100. In some embodiments, imaging device 100 may be or include for example a digital camera that may be linked to for example a computing device 102, such as for example a personal computer, work station, video game console, personal digital assistant, local area network, wide area network or other computing device 102 or system. One or both of imaging device 100 and computing device 102 may include for example a processor 104, such as for example a CPU or other processor. In some embodiments, processor 104 may include digital signal processing capabilities. In some embodiments, one or more of imaging device 100 and computing device 102 may include a data storage unit such as for example a memory 105 such as a random access memory, disc drive, flash memory or other mass data storage unit that may store for example image data or other data. In some embodiments, a system may include an output device 106 such as for example a display, such as a computer screen, video or other screen, one or more speakers, or other output devices 106 that may for example issue an instruction or other message that may be seen, heard, or otherwise perceived by a user or subject.

In some embodiments, one or more of the components of a system of the invention may be combined into fewer, or separated into a greater number of devices. For example, imaging device 100 may in some embodiments include or be connected to processor 104, memory 105 and output device 106, and all of such components may be housed in a single unit.

In operation and in some embodiments of the invention, imaging device 100 may capture an image of a figure 110. Processor 104 may calculate certain location coordinates of a figure 110 in the captured image, and such coordinates may define for example a position of one or more limbs, extremities or other features of figure 110 as such features may appear in the image. Output device 106 or some other component may instruct a user or figure 110 to alter, vary or change a position of one or more limbs, body parts, extremities or other features of figure 110. Imaging device 100 may capture another image of figure 110, and processor 104 may calculate another set of location coordinates that may define a position of figure 110 in such other image. Processor 104 may compare one or more of the location or position coordinates of figure 110, or a part of such figure 110, in the image that was captured for example before an instruction was given, with the location or position coordinates of figure 110, or a part of such figure 110, in the image that was captured after the instruction was given. Based on for example such comparison, one or more output devices 106 may signal a user as to the compliance of figure 110 with the instruction to alter or change a position. In some embodiments, an output device 106 may for example signal a user or other subject as to a non-compliance with the instruction, may indicate the nature of the non-compliance, and may suggest a correction of the position of figure 110 to achieve compliance with the instruction.

In some embodiments an image of a figure 110 may be captured when such image and figure is lit by for example incandescent, fluorescent or other visible light, or light that is generally readily available from for example ambient indoor lighting systems. In some embodiments, an image of a figure 110 may be captured when figure 110 is captured in outdoor light.

In some embodiments an instruction may be to add, pick up, discard or otherwise interact with one or more objects. In some embodiments, an instruction may be to interact with an object of a particular color, shape, consistency or other characteristic.

In some embodiments, figure 110 may be or include for example a body such as a human body or the body of some other animal or animate object. In some embodiments, a figure 110 may include a body and one or more inanimate objects such as for example blocks, tools, components or assemblies. In some embodiments, a figure 110 may include one or more inanimate objects that may be acted upon by a person or other user.

In some embodiments, processor 104 may process image data in a first image, and may separate or differentiate image data of a background from image data of figure 110. In some embodiments, imaging device 100 may initially or at some other time capture an image of a background without figure 110. For example, in some embodiments, a system, by way of for example, output device 106 or otherwise, may request that a figure 110 be removed from an area to be imaged, and an image of the area may be captured. The compliance of a figure 110 or user with such request may be for example tested or confirmed by for example motion detection techniques such as for example, checking for movement in the area to be imaged, such as by using for example a continuous consecutive frame subtraction along with a low threshold on the absolute subtraction values. The suspected movement areas may be verified by a connected component criteria to distinguish between real regions of movement and noisy isolated pixels. Other methods of confirming compliance with a request for a figure to be absent from a background are possible.

In a period when for example a figure 110 is out of view of imaging device 100, or during some other period, a processor may capture one or more images of a background and calculate statistics of a per pixel mean+variance image matrix of the background. In some embodiments, deviations from the statistically based mean+α times a variance threshold criteria per pixel in the image once figure 110 has entered the field of view of imaging device 100 may be used to determine the presence of figure 110 in the view of a particular pixel. Another background removal technique may include calculating a matrix of median values from a set of frames, and applying a threshold criteria to separate foreground objects. An appropriate threshold may be calculated using for example an analysis of a histogram of pixel values of the difference image. A typical difference image may result in a bi-modal histogram, where the brighter modality represents the foreground object such as a figure 110. In some embodiments, a threshold may be set as the grey level that maximizes the perpendicular distance to a point on the histogram from a line that connects or is tangent to the two modal's peaks. Where imaging device 100 is a color imager, this process may be performed on the different color channels separately, and the difference image may be performed for example from the maximum intensity values per pixel of the difference images from the different color channels. Other methods of background removal may be used.

Figure 2A:
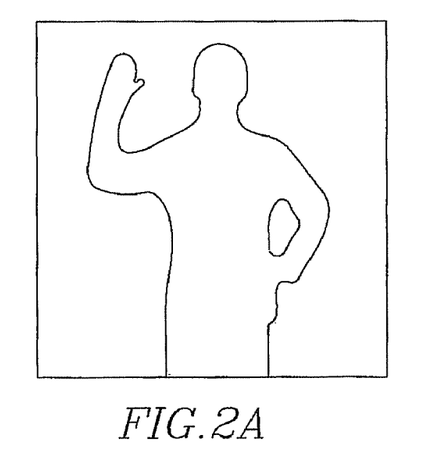
FIG. 2A illustrates a binary filtered image of a figure in accordance with an embodiment of the invention.

Reference is made to FIG. 2A, an illustration of a binary filtered image of a figure 110 following the differentiation of the foreground image from for example a background. Morphological filters such as closing and opening may be used to for example smooth boundaries of figure 110, and to for example fill gaps that may have been caused by for example imperfect binarization effects. For example, an area opening process may include a binary image labeling where connected components of the binary image are labeled in a unique manner, and labeled segments having an area below a given threshold are filled in or erased. Other processes may be used to unify or define an outline and area of a foreground or figure 110.

In some embodiments, an imaging device 100 or one or more other components of a system may center figure 110 within a field of view so that for example, at least a head and arms, or other extensions desired to be viewed are detected by imaging device 100. In some embodiments, a system, an operator or a component may direct that a field of view of imaging device 100 is to be centered around a largest non-background object in a field of view of imaging device 100, on the assumption that figure 110 is the largest object. Other methods of centering figure 110 in a field of view are possible. In some embodiments, an instruction to a user to center figure 110 in a field of view may be passed through output device 106. In some embodiments, a camera may be moved in response to a signal from for example processor 104, to center the field of view of imaging device 100 on figure 110. In some embodiments, a field of view may not be centered around a particular object or figure 110, such as for example when there are two figures 110 whose positions are being evaluated.

Figure 2B:
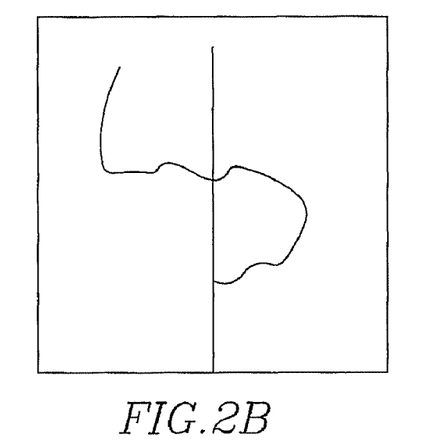
FIG. 2B illustrates a skeletonized image of a figure in accordance with an embodiment of the invention.

In some embodiments a pruned skeleton of figure 110 may be derived using for example a medial axis transform technique. For example, FIG. 2B illustrates a skeletonized image of a figure in accordance with an embodiment of the invention. A skeletonization of figure 110 may reduce the complexity of the classification of a pose of figure 110 by representing figure 110 as a series of lines and curves. A post-processing pruning step may be added to the skeletonization process, and such pruning may get rid of outlying or non-continuous extensions of the skeleton. In some embodiments, a skeletonization technique with built-in pruning of noisy artifacts, such as for example the Zhang-Suen technique, may be used. Other skeletonization processes are possible, and other methods of quantifying or reducing a complexity of a pose of figure 110 may be used.

Figure 2C:
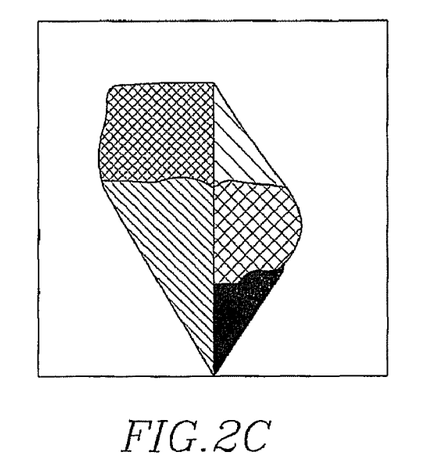
FIG. 2C illustrates convex hull deficiencies of the skeletonized image of a figure in accordance with an embodiment of the invention.

From the skeletonized figure, major convex deficiencies may be extracted by subtracting the skeleton from the convex hull image of the skeleton. Area opening processes may also filter out small regions from the result to further simplify the figure. For example, FIG. 2C illustrates convex hull deficiencies of the skeletonized figure 110. One or more of the convex hull deficiencies may be assigned a distinctive color or other label.

In some embodiments, a point representing an intersection of the arms or lateral axis of a figure 110 or skeleton of the figure 110, with a head or vertical axis of a figure 110 or skeleton of the figure 110, may be designated as a center of mass of figure 110. Other points or areas on a figure 110 may be designated as a center of mass. In some embodiments, a center of mass may be identified by a convolution operation of the skeletonized image with a constant value kernel that sums up the number of pixels in the skeleton. The convolved image may be applied with a predefined threshold value to find candidates for the center of mass point since the intersection points of a lateral or arm-shoulder axis and a vertical or head-torso axis may have more pixels than the curves or lines may have. In some embodiments, a conjecture of a center of mass may be confirmed as the desired center of mass by for example determining that such point is the meeting point of four neighboring convex hull deficiencies. Other methods of identifying or designating a mass center of a figure 110 are possible.

Figure 2D:
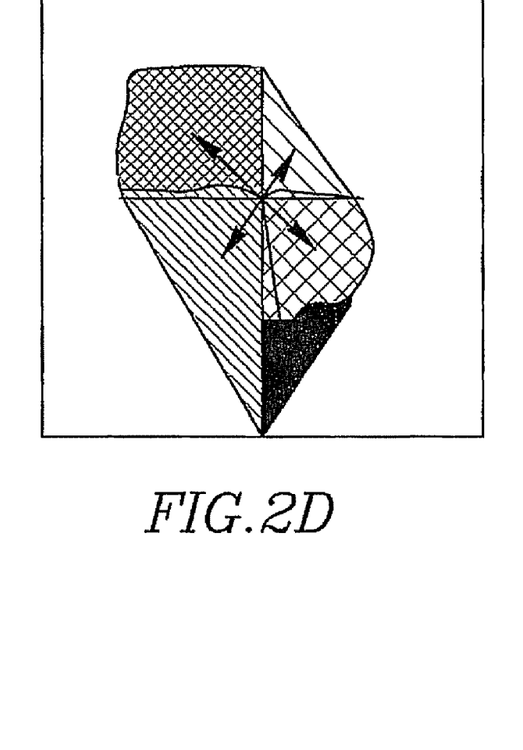
FIG. 2D illustrates distances and positions of centers of mass of convex hull deficiencies from a center of mass of a figure, in accordance with an embodiment of the invention.

A Euclidian distance from a mass center point of a figure 110 to a center or mass center of one or more of the convex hull deficiencies may be calculated. As is shown in FIG. 2D, distances and positions may be calculated from a center of mass of a figure 110 to a center of one or each of the convex hull deficiency areas of figure 110. The convex hull deficiencies positions may be designated by using for example quadrants around a center of mass of figure 110, and the quadrants may be referenced by the X,Y coordinates of the center or center of mass of a particular convex hull deficiency relative to the center of mass of figure 110. This location may be deducted from the sign of the differences in both X,Y directions calculated above to determine a position of the center of the deficiency relative to the mass center of figure 110.

A further calculation may be made of an openness of a particular convex hull deficiency. As is shown in FIG. 2D, a measure of the openness of a particular convex hull deficiency may be calculated by comparing the for example total perimeter length of particular convex hull deficiency to the portion of such perimeter that is included in a skeletonized figure. For example, and in some embodiments, when the openness value is 1, the entire convex hull deficiency may be enclosed within a skeletonized image. Openness may be used as an indication of whether an end or other portion of an arm, leg or other extremity is touching a body. Other measures of openness may be used and other calculations of an extremity relative to a body mass may be made. Other features of the figure may be extracted.

In some embodiments, distances of centers of convex hull deficiencies from a mass center of figure 110 may be normalized by a factor which may for example be determined from for example a bounding box of figure 110. Other normalization techniques may be used. Such normalization may impose an invariability to scale that may account for variability in the distance between for example an imaging device 100 and figure 110, or between a size of a particular feature or extremity of figure 110.

In some embodiments, a vector of the extracted features such as the location coordinates of centers of convex hull deficiencies as are collected in a first image, may be compared with corresponding location coordinates of centers of convex hull deficiencies in a second image. In some embodiments, the vectors of the location coordinates may be used to classify a pose of figure 110 by comparing or examining a Euclidian distance between this vector and a set of pre-learned vectors which may have been collected from prior analysis of a designated pose or a pose referred to by an instruction. In some embodiments, similarities between a derived vector of location coordinates and a pre-learned set of coordinates may be thresholded against minimum matching criteria to determine compliance or the extent of compliance with an instruction. For example, in some embodiments, real and/or normalized distances and positions of for example one or more location coordinates of for example centers or centers of mass of convex hull deficiencies relative to for example a mass center of a figure may be compared to an estimate or one or more samples of such real or normalized distances in respect of other figures as such other figures may have assumed a particular position. Such comparison may be used as an indication of a compliance of a figure with an instruction to assume a particular position, or for example as part of a determination as to a position of a figure. For example, a sample or collection of various location coordinates of figures in one or more positions may be collected in for example a data base. The collection may include for example location coordinates of sitting, standing, bending figures, and of figures in various other positions. Location coordinates of a figure may be collected and compared to such samples or collection of figures. A determination of the position of the subject figure may be made on the basis of such comparison.

Figure 2E:
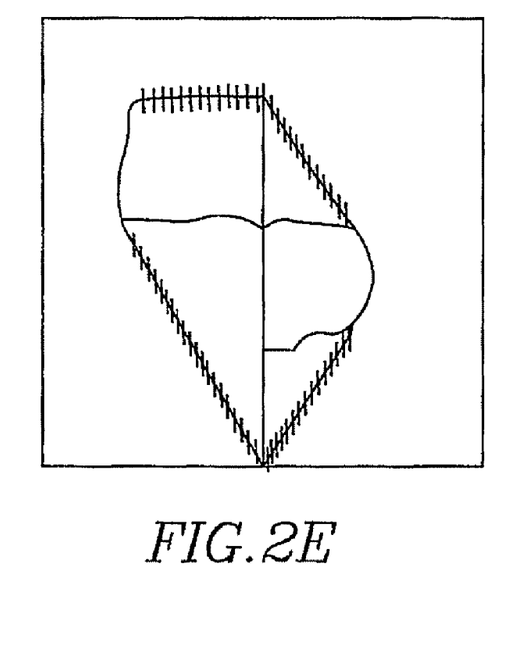
FIG. 2E illustrates a proportion of convex hull deficiency perimeters that are included in a skeleton of a figure in accordance with an embodiment of the invention.

Reference is made to FIG. 2E, a proportion of convex hull deficiency perimeters that are included in a skeleton of a figure in accordance with an embodiment of the invention. In such figure, the perimeters of convex hull deficiencies that are not part of the skeleton of the figure are shown in crossed lines. In some embodiments, openness factors, such as for example the number of closed loops of a skeletonized figure, or of a convex hull deficiency from an image that was captured before an instruction, may be compared to openness factors of an image captured after an instruction. Such comparisons may indicate a change in a position of one or more skeleton segments from one image to another. Other comparisons between location coordinates of parts of a skeletonized image and of centers of convex hull deficiencies may be made to determine a pose of figure 110, or the compliance of figure 110 with an instruction. Other measures of similarity on the features vectors may be used.

In some embodiments, location coordinates may refer to a point or area of an image relative to another point or area in the image, rather than to an actual point in space. For example, a location coordinate may refer to a point or area in an image relative to for example a mass center of a figure in the image. Location coordinates may be described as relative to some other reference point in an image.

In some embodiments, a data base of pre-learned vectors that may correspond to a pose may be updated with vectors collected from a particular user or FIG. 10. In some embodiments, non-parametric clustering techniques may be used to approximate representative characteristics of a particular pose. Furthermore, coordinates may be collected from more than one image such as for example from a series of images of figure 110, and a median of the collected coordinates may be considered in defining a position of figure 110, and in comparing the position to a pre-learned or prior set of coordinates. In some embodiments, collections of vectors may be classified as examples of figures in a particular position, and a comparison of particular vectors to the collections may estimate or determine the pose of a figure 110. In some embodiments, coordinates such as size, shape or color of various objects, such as balls, cubes, toys or instruments may be stored in for example a data base linked to a system, and the collected coordinates from for example a current image may be compared to the stored coordinates to determine for example if the object in an image is a recognized or known to the data base. For example, in an embodiment of a toy, coordinates of one or more known shapes of for example animals, pictures or other objects that may be part of for example a game, may be stored in a data base, such that a system may indicate when such recognized object appears in an image.

In some embodiments, location coordinates may be collected over a series of frames, and a figure's compliance with an instruction may be calculated continuously, to note for example that a figure has changed a position. In some embodiments, only a significant variation from a range of stored coordinates that are associated with a pose may elicit a signal of non-compliance with an instruction.

In some embodiments, an instruction may entail an introduction into an image of a colored object. For example, an instruction may be or include "Now pick up a red ball with your left hand". Compliance with a color-dependent instruction may be gauged by clustering for example non-background colors in an image that is captured prior to the instruction, and repeating the color clustering in an image that is captured following the instruction. A comparison of image intensities and locations of the color clusters between the images, may be used in determining compliance with an instruction. Similarly, a comparison of one or more location coordinates in a pre-instruction and post-instruction image may be combined with a location coordinate of a color cluster to determine for example a proximity of a designated limb or extremity to a particular color cluster.

For example, the colors appearing in a foreground in a pre-instruction image may be clustered in for example a non-parametric clustering process that allows a large set of color pixels to be clustered. In some embodiments, a mean-shift algorithm may be used in such clustering. Other clustering methods may be used. In some embodiments, the colors may be extracted and the color vector may be recorded. The main colors of the figure may be extracted using another clustering on the color vectors found. A comparison may be made between the color clusters, and in some embodiments the locations of such clusters in an image captured prior to an instruction, and the color clusters and their locations in an image captured after the instruction. Other methods of color segmentation may be used.

In some embodiments, a clustering procedure for colored object recognition may be performed on one or a series of images, where for example the basis of pixel values in a colored portion of an image that is for example newly introduced may be compared with for example colored areas in a prior image. For example, a clustering may be performed on a color space that includes for example Red, Green Blue, (other color spaces can be used), where a result of for example a non-parametric clustering (such as mean-shift) may be a set of color vectors that represent for example the major colors in the image. When performed on a few images these color vectors can be determined with a greater accuracy by performing for example a second color based clustering on colored areas that had been clustered into for example broad cluster ranges. In some embodiments, the location of for example a color cluster may be mapped relative to the location of for example other color clusters, skeleton hull deficiencies or the location coordinates of other parts of for example a figure.

When for example a new color or a new colored object appears in an image, a further clustering procedure may be performed that may detect the presence of the new color or the new colored object and may identify a color of an object in the image. If for example no color vector from the former image or calculation is similar or close in space or location to a color cluster in a prior or previous image, such color or colored object may be detected as a new color or new colored object. In some embodiments, a color clustering or other detection of a color or colored object may be undertaken with or without background subtraction.

If the class of instructions used for example is to show a known object with a certain shape or image on it to the imaging device 100, a pattern recognition algorithm may use a fast scale and rotation invariant transform such as the Mellin transform based template matching.

In some embodiments, a signal may be issued to for example a user or a figure 110 to note compliance or non-compliance with an instruction. For example an output device 106 such as one or more speakers may employ voice synthesis instructions or taped messages to inform a user of his compliance or non-compliance with an instruction. In some embodiments a processor 104 may access a data base of parts of messages and assemble a response that matches the compliance or non-compliance with the instruction. In some embodiments, a message may appear on a screen or other display to indicate compliance or non-compliance.

In some embodiments, a processor may diagnose a non-compliance, and inform a user of the particular aspect of a non-compliance along with a suggestion of how to correct the non-compliance. Other encouragements or instructions may be transmitted or conveyed. For example, a message of "Raise your knees higher" or "That's good, now try it with your elbows bent" may be conveyed to a user or figure 110. In some embodiments, a series of instructions may create for example an exercise regimen for a user, a training session or other series of movements.

Figure 3:
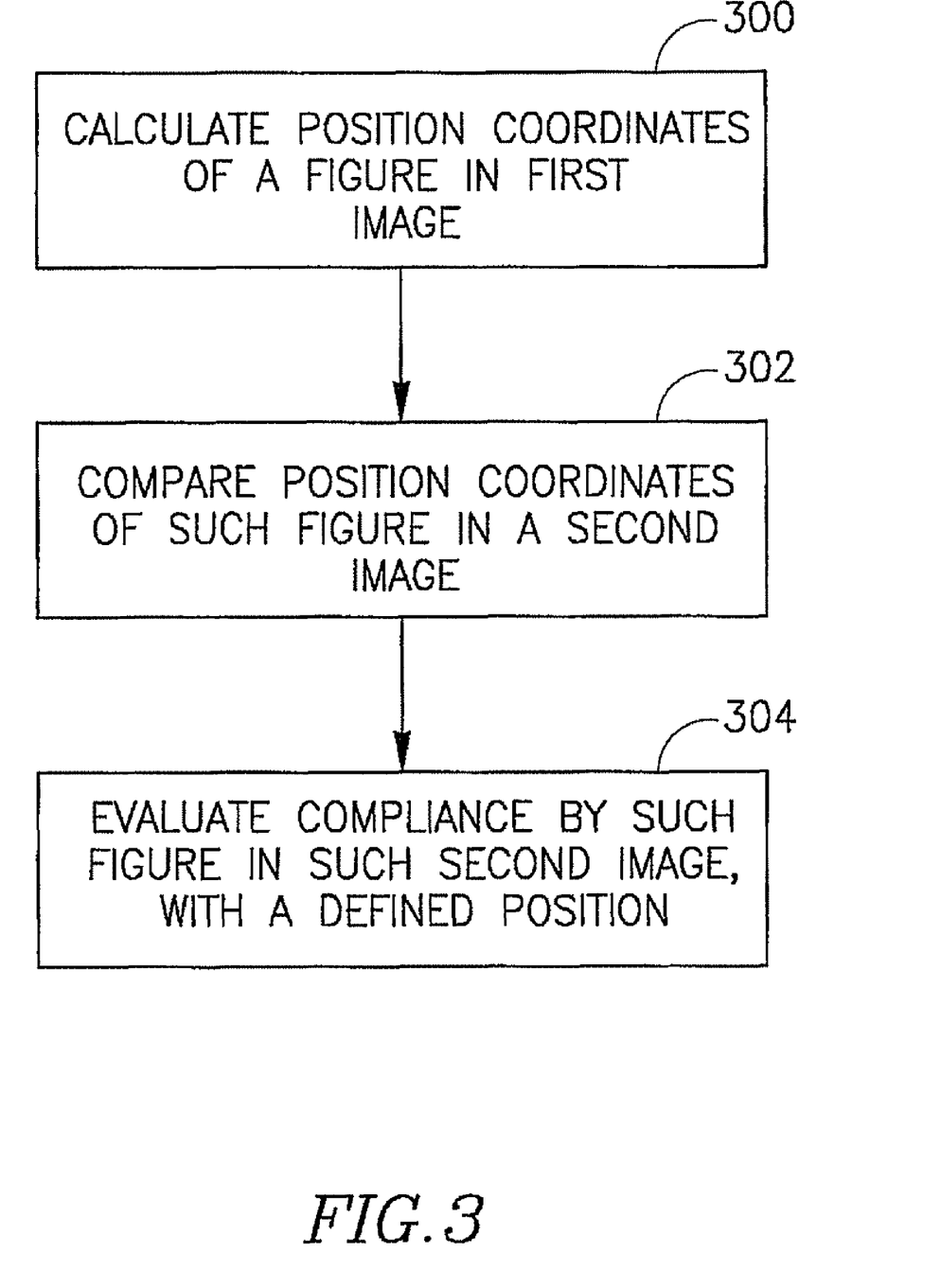
FIG. 3 is a flow diagram of a method in accordance with an embodiment of the invention.

Reference is made to FIG. 3, a flow diagram of a method in accordance with an embodiment of the invention. In block 300, a calculation of one or more position coordinates of a figure in an image may be performed. In some embodiments, the position coordinates may include for example a mass center of a figure, and for example one or more location coordinates of for example a center, edge or other point of one or more convex deficiencies of a for example skeletonized image of a figure. Other location coordinates may be calculated and stored in for example a memory.

In block 302, a second calculation may be performed of location coordinates of the figure in a second image. In some embodiments, the location coordinates of the figure in the second image may be compared with the location coordinates of the figure in the first image, and the differences in such locations may be calculated.

In block 304, the location of particular coordinates in the second image are compared to for example corresponding location coordinates in the first image, and the relative movement or change in position of the coordinates may be calculated along with an expected position of such coordinates that would correspond to the position to be taken by a figure in compliance with an instruction to assume a defined position. For example a coordinate of a top of a head in a skeletonized image of a figure in a second image may be lower, either absolutely or relatively than a coordinate of a mass center of a figure in a first image. The lower coordinate for a top of a head may correspond to an instruction to a figure to perform a knee bend that was issued between the capture of the first image and the capture of the second image. In some embodiments, an output device may indicate compliance with an instruction to the user or figure.

In some embodiments, a method of the invention may monitor a figure to determine if the figure has altered a position. For example, in some embodiments, a method of the invention may capture a first image of for example a bed-ridden or otherwise immobilized figure, as the figure may for example rest in a bed. A method of the invention may monitor the movement of the figure, and may issue an alert if the figure moves for example a limb or extremity to an extent that may exceed a pre-defined threshold.

In some embodiments, one or more location coordinates of a figure may be compared to for example one or more samples of location coordinates of figures in one or more positions. A determination of the position of the figure in an image may be made by such comparison. In some embodiments, a collection or data base of 'learned coordinates' may be collected from for example a single user or a sample of more than one users, and such sample or learned coordinates may be stored as corresponding to a particular pose. Coordinates that may be collected later may be compared to such learned poses to determine a compliance with an instruction or a progress of a user. For example, a patient undergoing a course of physical therapy may be instructed to assume a position or perform an exercise. A therapist may perform the exercise and a system may record the coordinates of the therapist during the sample period. A patient may then perform the same exercise, and an embodiment of the invention may compare the patient's performance to that of the therapist, and may track the patient's performance.

In some embodiments, a system may refine or continuously learn to identify a pose or position of a particular user. For example, in the case where location coordinates or color coordinates of a particular pose or object are stored in for example a data base, a system may collect coordinates of a particular user in a same position. A system may upon evaluating a position of a figure in an image, refine the stored coordinates by comparing them with the actual coordinates collected from the image of the user in the same position. In some embodiments, an average of the stored and the new coordinates may become part of a new measure for determining a compliance of a user with the particular pose. For example, a coefficient $\alpha$ which can be derived from a level of certainty of a classification of a position such as $(1-\alpha)*OLD + \alpha*NEW$ when $\alpha=0.01$. This will bias the classification vector toward a better representation of that position for the specific subject for better future classification rate.

It will be appreciated by persons skilled in the art that embodiments of the invention are not limited by what has been particularly shown and described hereinabove. Rather the scope of at least one embodiment of the invention is defined by the claims below.

The invention claimed is:
1. A system comprising:
an imaging device to capture, using visible light, first and second images, each including first and second figures;
an output device to output instructions for a change in a position of each of said first and second figures; and a processor to compare, for each of said figures, a first position in said first image to a second position in said second image and to determine compliance with the instructions.

2. The system as in claim 1, wherein said processor evaluates a location coordinate of each of said figures in each of said images.

3. A system comprising:
an imaging device to capture a plurality of images using visible light, a first of said images including a figure;
a processor; and
an output device; wherein
said processor determines compliance with an instruction from said output device to introduce an object into a second of said plurality of images, said second image including said figure and said object.

4. The system as in claim 3 wherein said processor determines compliance with said instruction by comparing said first image to said second image.

5. The system as in claim 3, wherein
said second image includes said object in a second position;
said first image includes said figure and said object, said object in a first position; and
said processor determines compliance with said instruction to alter a position of said object.

6. The system as in claim 3, wherein said processor compares a characteristic of said object in said second image with a characteristic of said object stored in a memory.

7. The system as in claim 6, wherein said characteristic is selected from a group consisting of a shape of said object, a color of said object and a consistency of said object.

8. The system as in claim 3, wherein said processor determines compliance with said instruction to alter a proximity of said object relative to said figure.

9. The system as in claim 3, wherein said processor identifies said object by a color clustering of said second image.

10. A system comprising
an imaging device to capture an image using visible light, said image including an object and a figure;
a processor; and
an output device; wherein
said processor determines compliance with an instruction issued by said output device, said instruction for said figure to interact with said object.

11. The system as in claim 10, wherein said image is a second image, and wherein said imaging device captures a first image, and wherein said interacting is selected from the group consisting of adding said object to said second of said plurality of images, picking up said object, and discarding said object from said second image.

* * * * *